(12) United States Patent
Chen et al.

(10) Patent No.: US 7,862,372 B2
(45) Date of Patent: Jan. 4, 2011

(54) POWER SUPPLY AND CONNECTOR ASSEMBLY THEREOF

(75) Inventors: Ming-Ke Chen, Shenzhen (CN); Hsiu-Chang Lai, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/500,580

(22) Filed: Jul. 9, 2009

(65) Prior Publication Data

US 2010/0297887 A1 Nov. 25, 2010

(30) Foreign Application Priority Data

May 25, 2009 (CN) .................... 2009 1 0302590

(51) Int. Cl.
*H01R 13/66* (2006.01)

(52) U.S. Cl. .................................................. 439/540.1
(58) Field of Classification Search ............. 439/840.1, 439/701, 717, 676, 715, 541.5
See application file for complete search history.

(56) References Cited

U.S. PATENT DOCUMENTS

| 5,427,549 A | * | 6/1995 | Smith et al. ................. 439/701 |
| 6,935,902 B1 | * | 8/2005 | Chou .......................... 439/701 |
| 2007/0270003 A1 | * | 11/2007 | Lin et al. .................... 439/101 |

* cited by examiner

*Primary Examiner*—T C Patel
*Assistant Examiner*—Phuongchi T Nguyen
(74) *Attorney, Agent, or Firm*—Zhigang Ma

(57) ABSTRACT

A power supply includes a body, a number of cables, a first connector, and a second connector. The first and second connectors are connected to the body of the power supply via the cables. The first connector includes a first connecting portion. The second connector includes a second connecting portion, operable to engage with the first connecting portion.

4 Claims, 6 Drawing Sheets

POWER SUPPLY AND CONNECTOR ASSEMBLY THEREOF

BACKGROUND

1. Technical Field

The present disclosure relates to power supplies and, more particularly, to a power supply and a connector assembly of the power supply.

2. Description of Related Art

Electronic connectors, such as connectors of power supplies are generally used for connecting to and providing voltages to motherboards. Due to integrated configuration of the electronic connectors, disassembly of an integrated electronic connector is impossible, thus causing inconvenience.

There are generally two types of central processing unit (CPU) power interfaces, i.e., 4-pin and 8-pin, depending on the type of CPU, which means there must be at least two types of connectors. Therefore, different power supplies to match with different CPU power interfaces must be available, which is inconvenient, and not cost-efficient.

DETAILED DESCRIPTION

Figure 1:
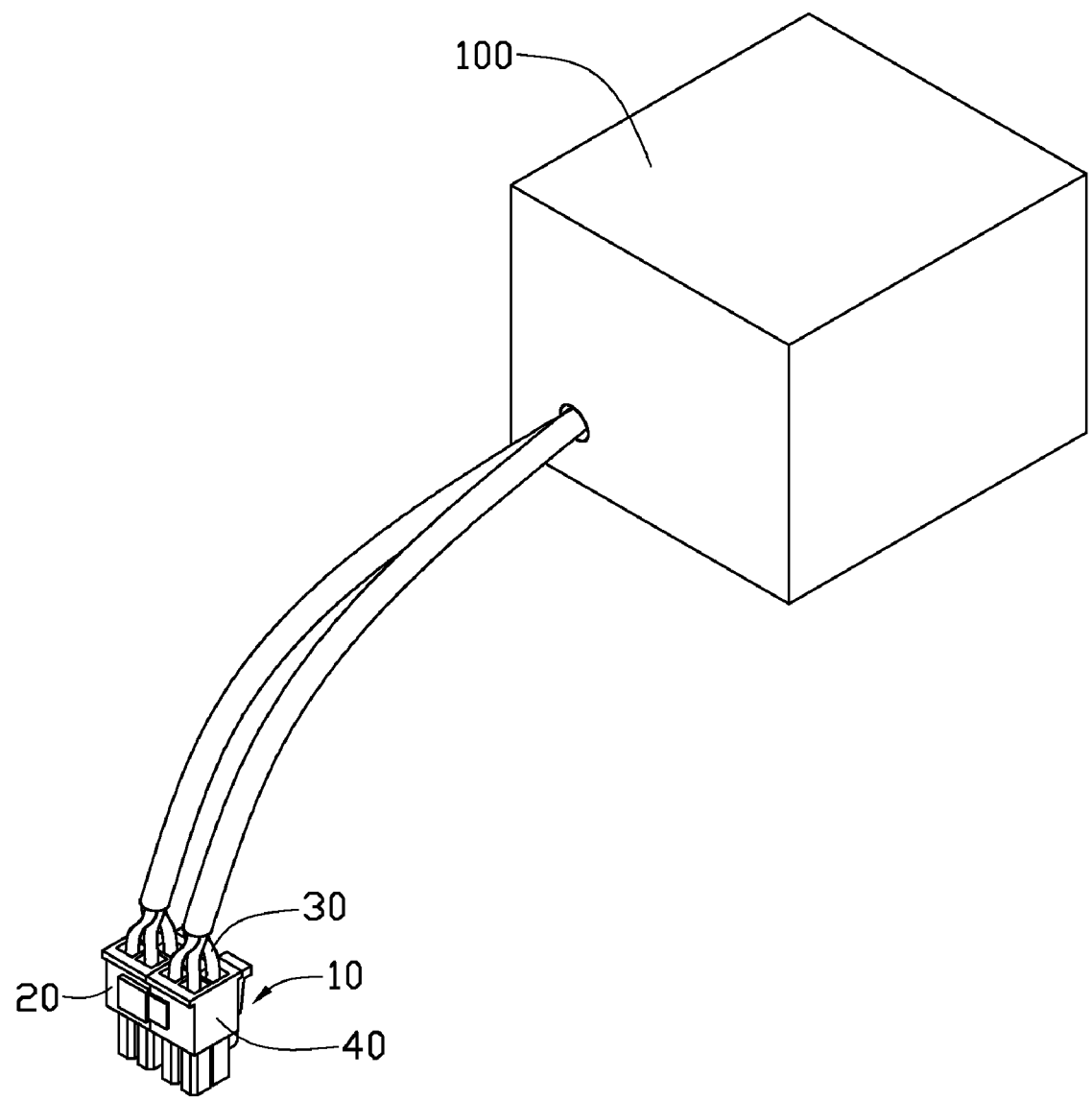
FIG. 1 is a schematic, isometric diagram of a connector assembly connecting with a power supply in accordance with an embodiment.
Figure 2:
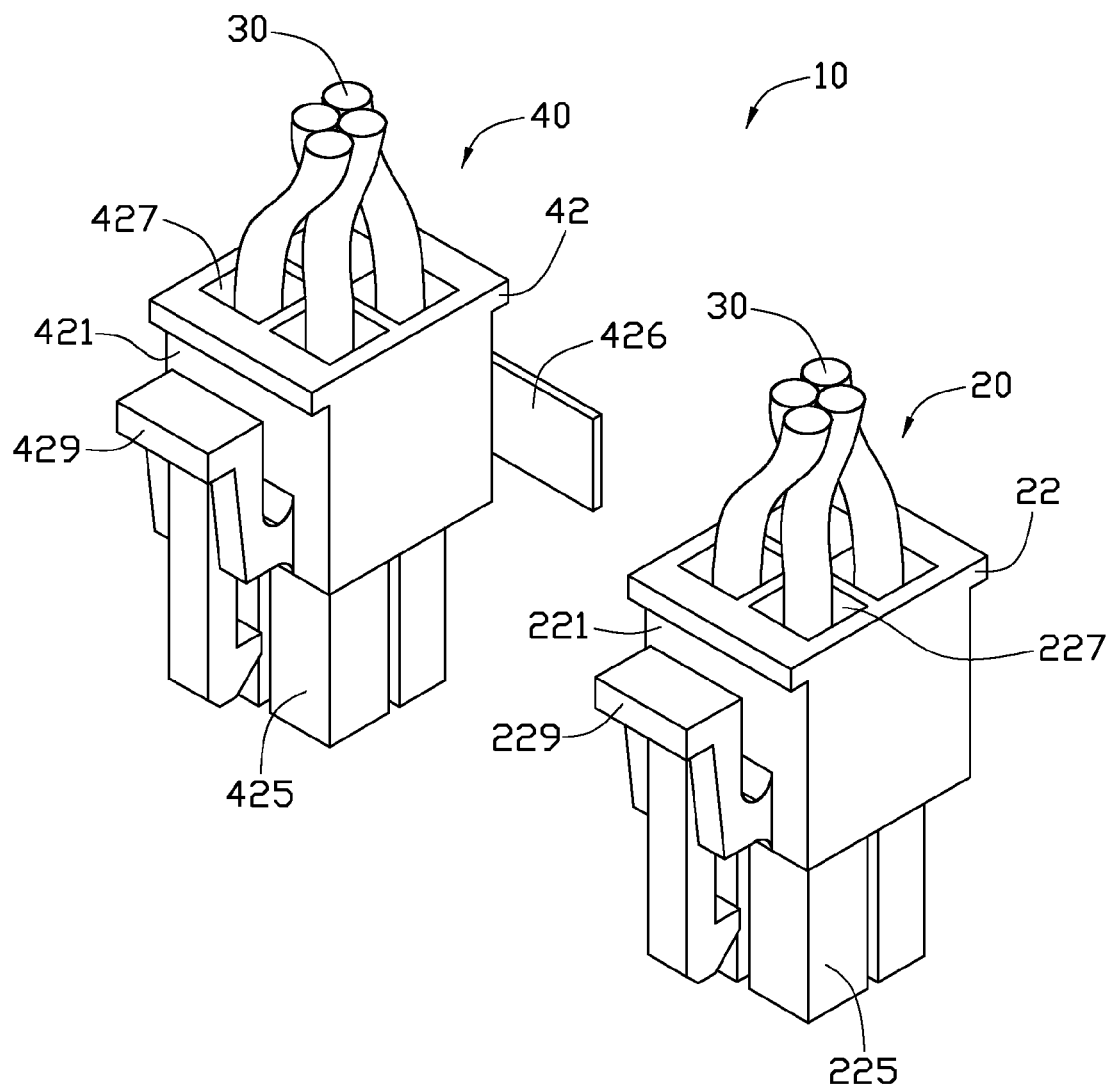
FIG. 2 is an exploded, isometric view of the connector assembly of the FIG. 1.
Figure 3:
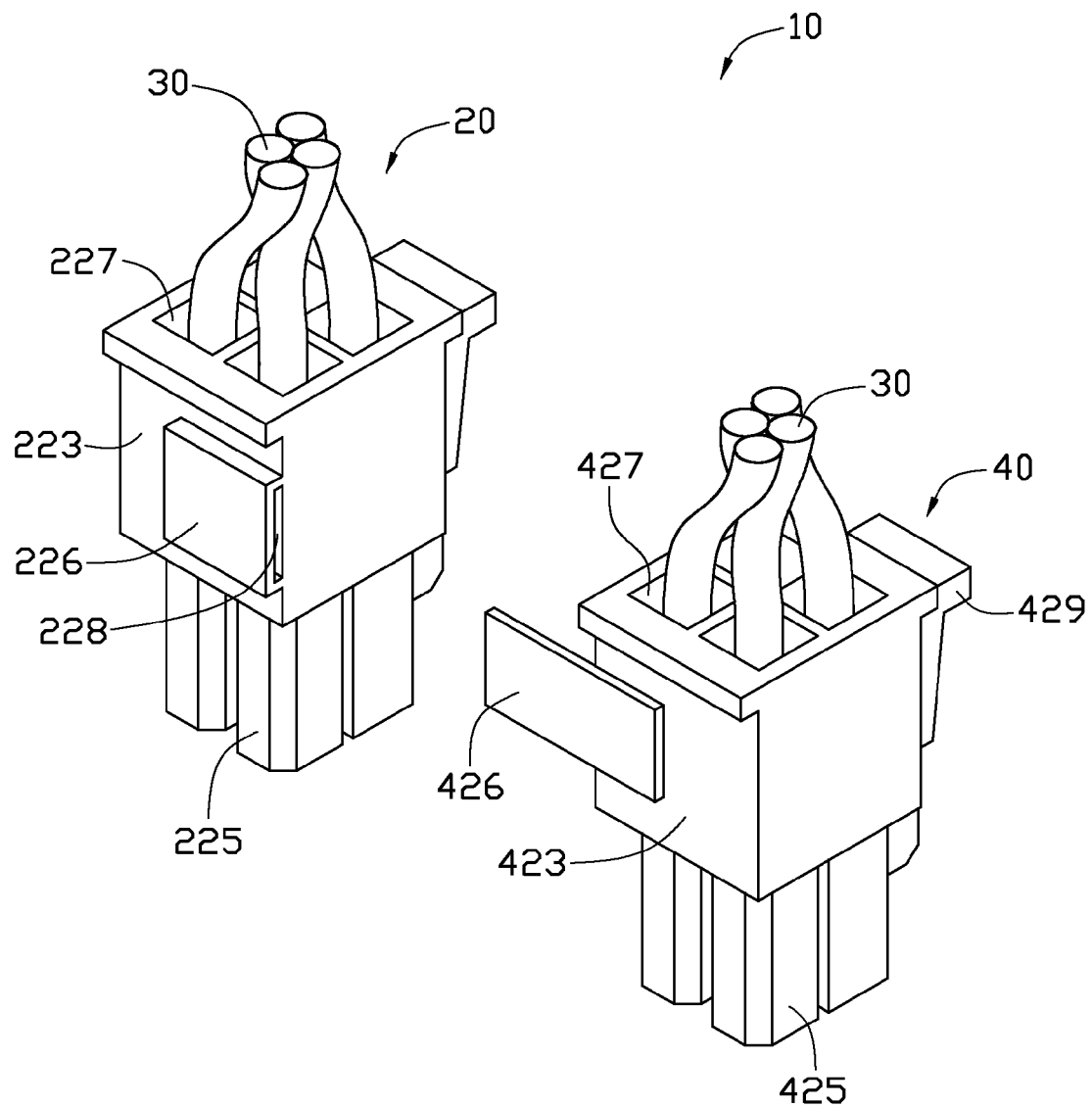
FIG. 3 is similar to FIG. 1, but viewed from another perspective.
Figure 4:
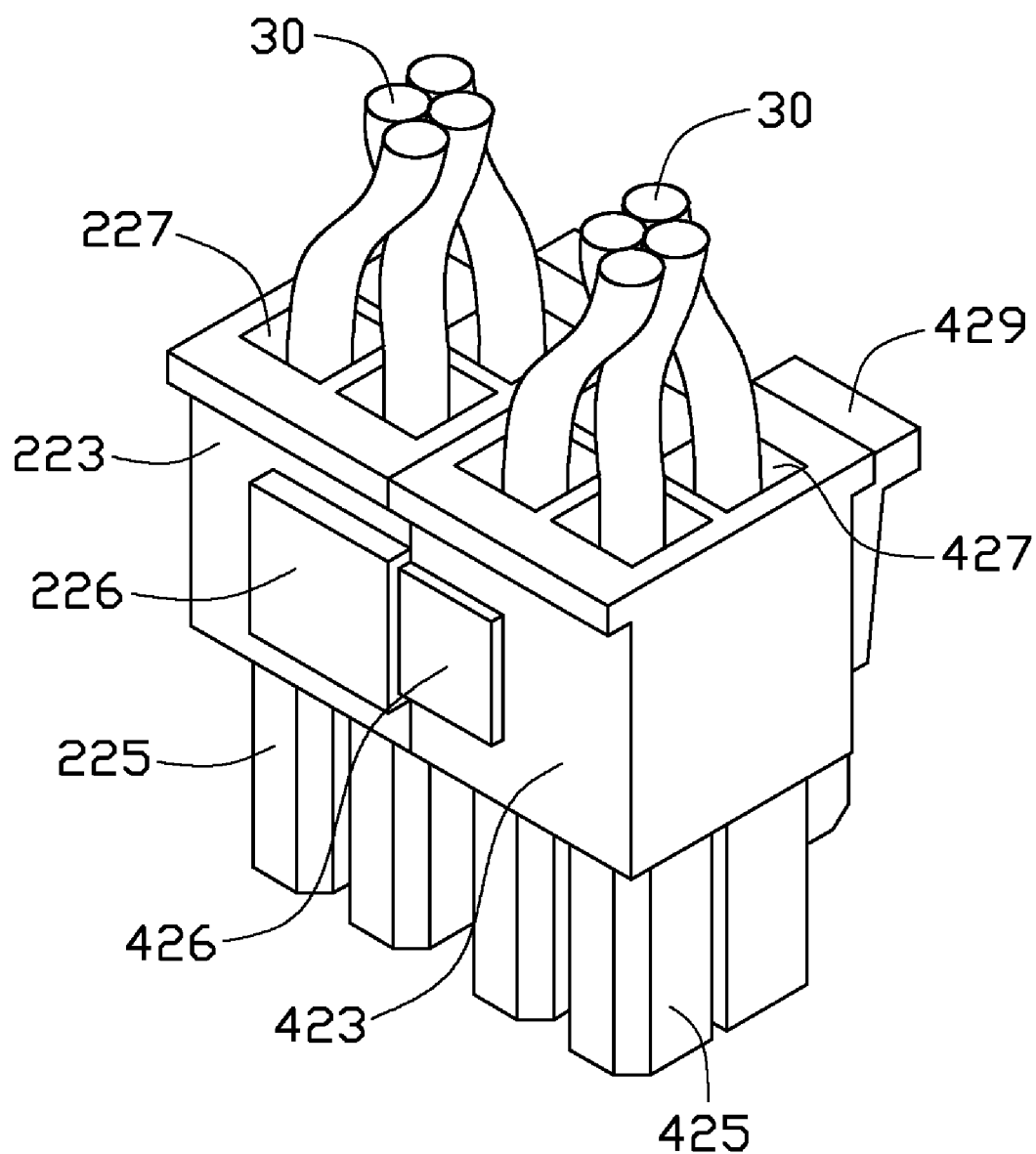
FIG. 4 is an assembled, isometric view of the connector assembly of FIG. 2.

Referring to FIG. 1 to FIG. 4, an exemplary embodiment of a power supply includes a body 100 supplying power and a connector assembly 10 connected to the body 100. The connector assembly 10 includes a first connector 20, a second connector 40, and a plurality of wires 30. The plurality of wires 30 connects the first connector 20 and the second connector 40 to the body 100 of the power supply. The wires 30 connected to each of the first and second connectors 20, 40 include two power wires and two ground wires. A first end of each of the first connector 20 and the second connector 40 is connected to the body 100 of the power supply via the corresponding wires 30, and a second end of each of the first connector 20 and the second connector 40 is to be connected to a CPU power interface of a motherboard. The first connector 20 and the second connector 40 can be assembled together to function as one connector or disassembled to function as two connectors for connecting to different CPU power interfaces.

The first connector 20 includes a main body 22. Four post-shaped jacks 225 are formed on the second end of the main body 22, and each jack 225 includes a plurality of electrical terminals (not shown). Four square openings 227 are defined in the first end of the main body 22 for the corresponding wires 30 which are electrically connected to the electrical terminals of the first connector 20 and extend out therethrough. A latching portion 229 protrudes from a sidewall 221 of the main body 22. A connecting portion 226 defining a long clasping slot 228 is set on a sidewall 223 opposite to the sidewall 221 of the main body 22.

The second connector 40 includes a main body 42. Four post-shaped jacks 425 are formed on the second end of the main body 42, and each jack 425 includes a plurality of electrical terminals (not shown). Four square openings 427 are defined in the first end of the main body 42, for the corresponding wires 30 electrically connected to the electrical terminals of the second connector 40 extending out therethrough. A latching portion 429 protrudes from a sidewall 421 of the main body 42. A connecting portion, such as a long connecting piece 426 is set on a sidewall 423 opposite to the sidewall 421 of the main body 42. The connection piece 426 is operable to engage in the clasping slot 228 of the first connector 20, to assemble the first connector 20 and the second connector 40 together.

In other embodiments, shapes of the connecting portions can be designed according to need besides the shapes of the clasping slot 226 and the connecting piece 426 in the embodiment.

Figure 5:
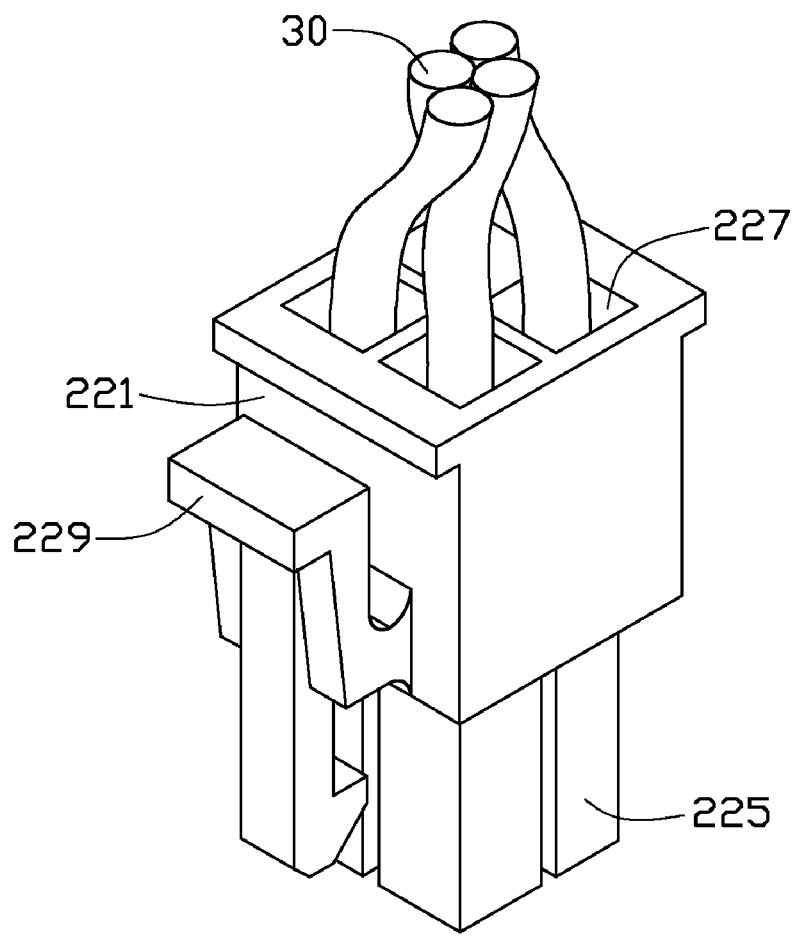
FIG. 5 is an exploded, isometric view of a connector of the connector assembly of FIG. 1 and a 4-pin CPU power interface of a motherboard.
Figure 5:
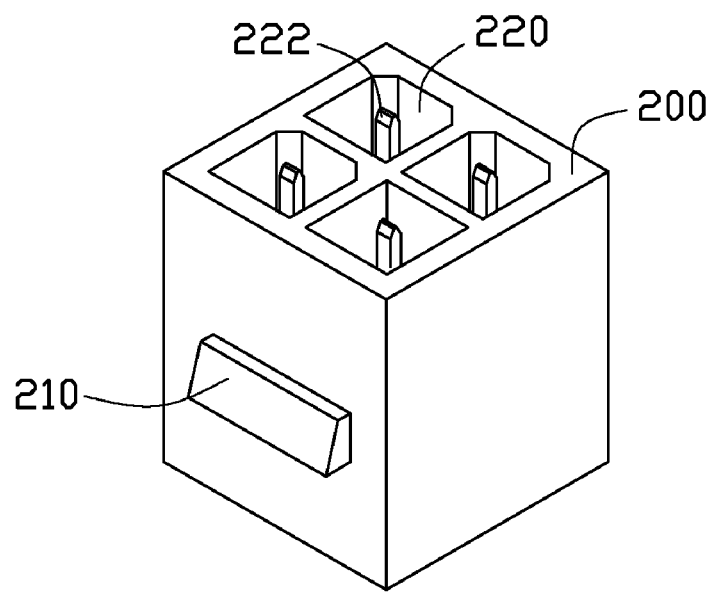
Figure 6:
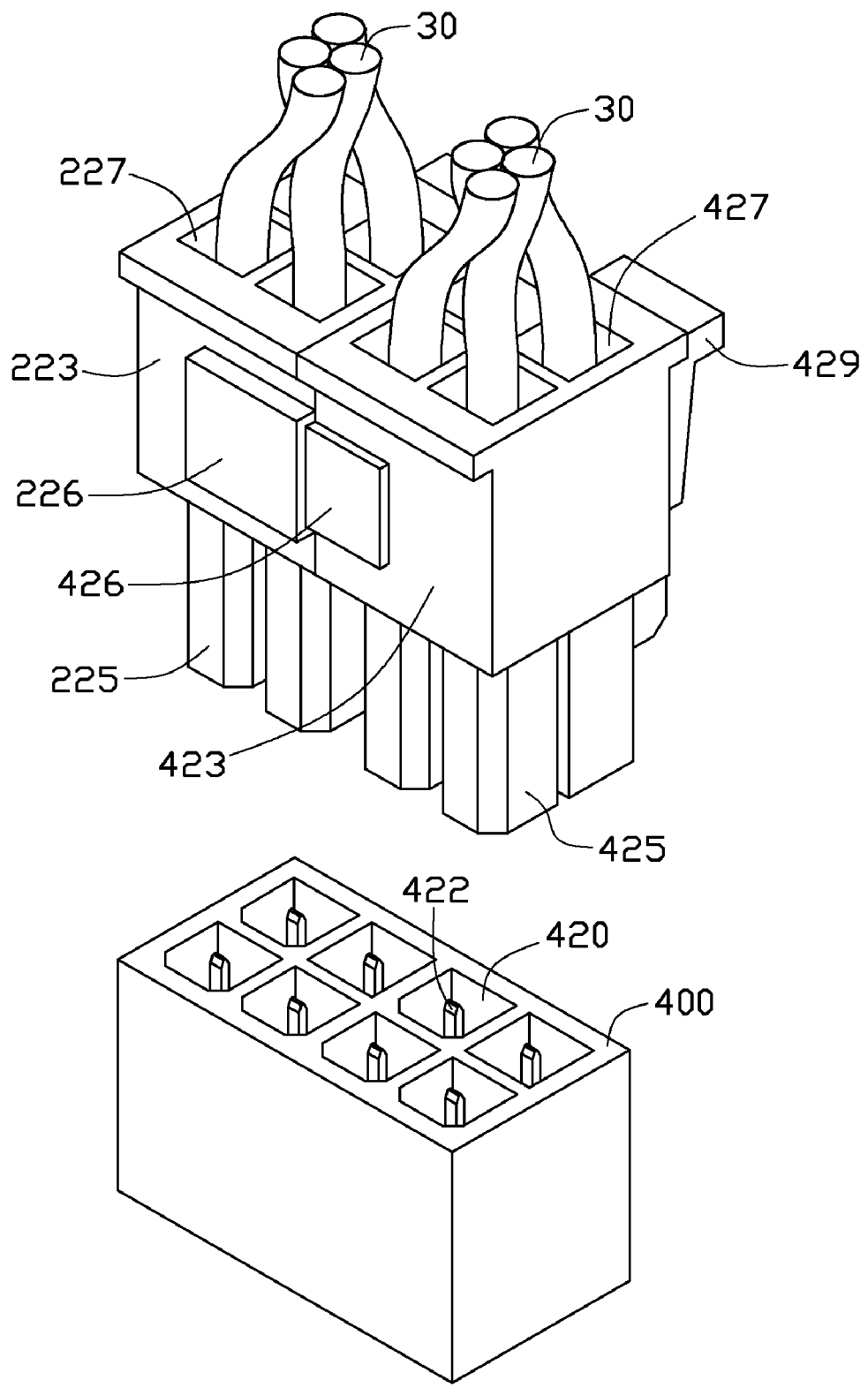
FIG. 6 is an exploded, isometric view of the connector assembly of FIG. 3 and an 8-pin CPU power interface of a motherboard.

Referring to FIGS. 5 and 6, when the power supply supplies power to a CPU of a motherboard having a 4-pin CPU power interface 200, the first connector 20 and the second connector 40 can be disassembled and selectively connected to the 4-pin CPU power interface 200 of the motherboard. When the first connector 20 is connected to the 4-pin CPU power interface 200, the jacks 225 of the first connector 20 are plugged in square openings 220 defined in the CPU power interface 200, the electrical terminals of the first connector 20 are electrically connected to electric pins 222 of the power interface 200. The clasping portion 229 of the first connector 20 engages with a locking portion 210 of the CPU power interface 200, to fix the first connector 20 on the CPU power interface 200 of the motherboard. Therefore, the power supply supplies power to the CPU of the motherboard, via the first connector 20 and the CPU power interface 200. The second connector 40 may be connected to the 4-pin CPU power interface 200 in the same way.

When the power supply supplies power to a CPU of a motherboard having an 8-pin CPU interface 400, the first connector 20 and the second connector 40 are assembled together via the connecting piece 426 engaging in the clasping slot 226. The jacks 225 and 425 are plugged in square openings 420 defined in the CPU power interface 400, and the electrical terminals of the first connector 20 and the second connector 40 are electrically connected to electric pins 422 of the power interface 400. The clasping portion 229 of the first connector 20 and the clasping portion 429 of the second connector 40 engage with a locking portion (not shown) of the CPU power interface 400, to fix the first connector 20 and the second connector 40 on the CPU power interface 400 of the motherboard. Therefore, the power supply supplies power to the CPU of the motherboard, via the first connector 20, the second connector 40, and the CPU power interface 400 of the motherboard.

The first connector 20 and the second connector 40 can be disassembled and selectively connected to a 4-pin CPU power interface for supplying power to the CPU of the motherboard. The first connector 20 and the second connector 40 can also be assembled together to connect to an 8-pin CPU power interface for supplying power to the CPU of the motherboard. Therefore, the power supply and the connector assembly can be used with different CPU power interfaces, which is convenient and cost saving.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others skilled in the art to utilize the disclosure and various embodiments and with various modifications as are suited to the particular use contemplated. Alternately embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A power supply comprising:
   a power supply body supplying power;
   a first connector comprising a rectangular first body, a plurality of openings defined in a first end of the first body for wires extending therethrough and electrically connecting electrical terminals of the first connector to the power supply body, a first sidewall, a second sidewall, a third sidewall opposite the first sidewall, a fourth sidewall opposite the second sidewall, the sidewalls extending from the first end of the first body, a first connecting portion formed on the first sidewall, and a clasping slot defined in the first connecting portion;
   a second connector comprising a rectangular second body, a plurality of openings defined in a first end of the second body for wires extending therethrough and electrically connecting electrical terminals of the second connector to the power supply body, a first sidewall of the second connector, a second sidewall of the second connector, a third sidewall of the second connector opposite the first sidewall of the second connector, a fourth sidewall of the second connector opposite the second sidewall of the second connector, the sidewalls of the second connector extending from the first end of the second body, a second connecting portion formed on the first sidewall of the second body, and a connecting piece formed on the second connecting portion engaging in the clasping slot of the first sidewall of the first connector, thereby connecting the first and second connectors together, with the first sidewalls of the first and second connectors being coplanar, and the second sidewall of the second connector abuttingly faces the second sidewall of the first connector;
   a first latching portion protruding from the third sidewall of the first connector and engaging with a locking portion of a first power interface; and
   a second latching portion protruding from the third sidewall of the second connector and engaging with a locking portion of a second power interface.

2. The power supply of claim 1, wherein the first and the second connectors are operable to be disassembled in response to the first connecting portion disengaging from the second connecting portion, and to selectively connect to a first power interface; and wherein the first and second connectors can be assembled together in response to the first connecting portion engaging with the second connecting portion, to connect to a second power interface different from the first interface.

3. A connector assembly, comprising:
   a first connector comprising a rectangular first body, a plurality of openings defined in a first end of the first body for wires extending therethrough and electrically connecting electrical terminals of the first connector and a power supply body, a first sidewall, a second sidewall, a third sidewall opposite the first sidewall, a fourth sidewall opposite the second sidewall, the sidewalls extending from the first end of the first body, a first connecting portion formed on the first sidewall, and a clasping slot defined in the first connecting portion; and
   a second connector comprising a rectangular second body, a plurality of openings defined in a first end of the second body for wires extending therethrough and electrically connecting electrical terminals of the second connector and the power supply body, a first sidewall of the second connector, a second sidewall of the second connector, a third sidewall of the second connector opposite the first sidewall of the second connector, a fourth sidewall of the second connector opposite the second sidewall of the second connector, the sidewalls extending from the first end of the second body, a second connecting portion formed on the first sidewall of the second body, and a connecting piece formed on the second connecting portion engaging in the clasping slot of the first sidewall of the first connector, thereby connecting the first and second connectors together, with the first sidewalls of the first and second connectors being coplanar, and the second side wall of the second connector abuttingly faces the second sidewall of the first connector;
   a first latching portion protruding from the third sidewall of the first connector and engaging with a locking portion of a first power interface; and
   a second latching portion protruding from the third sidewall of the second connector and engaging with a locking portion of a second power interface.

4. The connector assembly of claim 3, wherein the first and the second connectors are operable to be disassembled via disengaging the first connecting portion from the second connecting portion, and to selectively connect to a first power interface, and wherein the first and the second connectors are operable to be assembled together via engaging the first connecting portion with the second connecting portion, to connect to a second power interface different from the first power interface.

* * * * *